Figure 1:
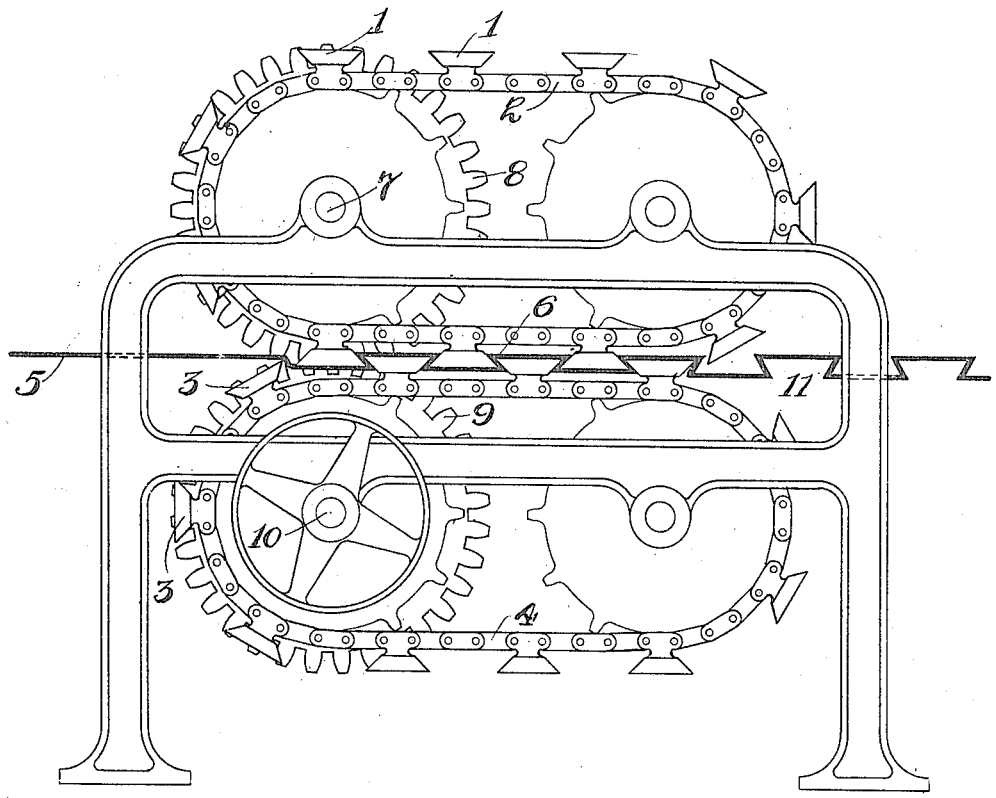

S. M. FORD.
METHOD OF MAKING LATH BOARD.
APPLICATION FILED NOV. 12, 1915.

1,208,535.

Patented Dec. 12, 1916.
2 SHEETS—SHEET 1.

Inventor
Silas M Ford by C. P. Enochs
Attorney

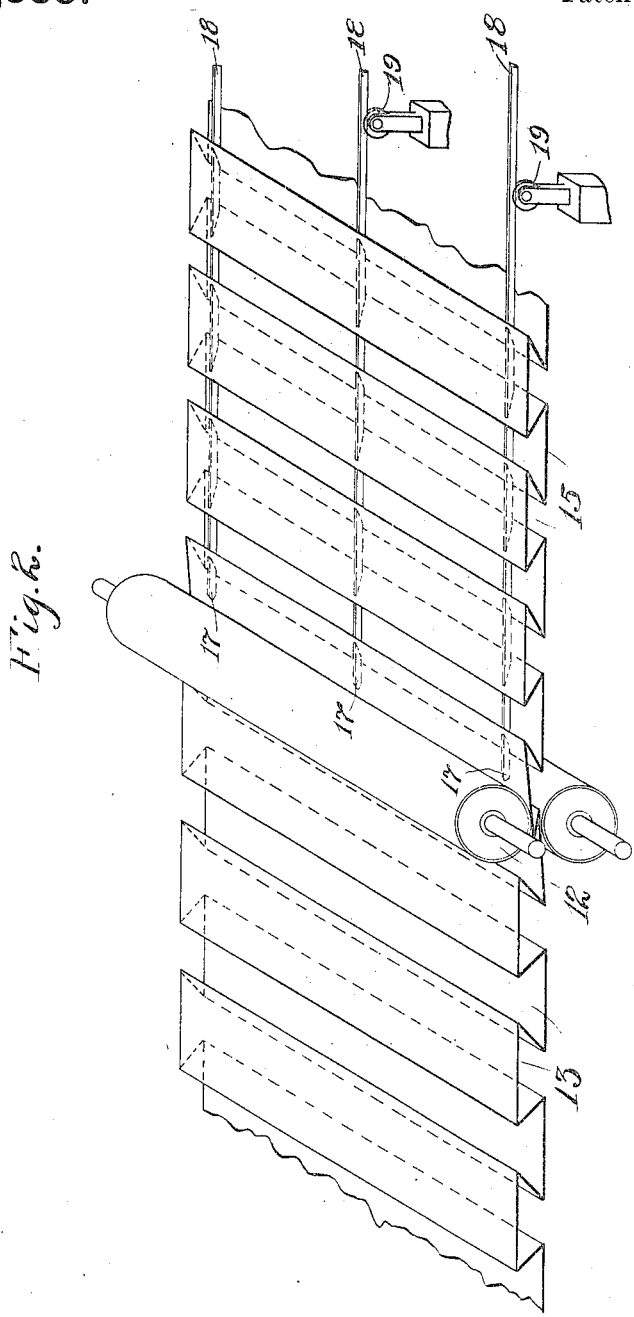

UNITED STATES PATENT OFFICE.

SILAS M. FORD, OF ST. PAUL, MINNESOTA.

METHOD OF MAKING LATH-BOARD.

1,208,535.  Specification of Letters Patent. Patented Dec. 12, 1916.

Application filed November 12, 1915. Serial No. 61,186.

*To all whom it may concern:*

Be it known that I, SILAS M. FORD, a citizen of the United States, residing at St. Paul, in the county of Ramsey and State of Minnesota, have invented certain new and useful Improvements in Methods of Making Lath-Board, of which the following is a specification.

This invention relates to a method of making lath-board from paper or other suitable material impregnated with water-proof compounds, and stiffening or strengthening the board by reinforcing it with round or flat wires.

One object of my invention is to provide a method of forming the material used into a plaited or dove-tailed shape, so as to provide means for anchoring the plaster when it is spread upon the lath-board.

Another object of my invention is to provide a method of stiffening lath-board when it is formed into a plaited or dove-tailed shape by reinforcing it with metal strips or rods.

With these and incidental objects in view the invention consists in certain novel methods of shaping the material and applying the reinforcing strips or rods to the material, the essential elements of which are set forth in appended claims and a preferred form of embodiment of which is hereinafter described with reference to the drawings which accompany and form a part of this specification.

Figure 1 is a side elevation of a machine that may be employed with my improved method of making lath-board, and Fig. 2 is a perspective view showing a method of sizing down the corrugated board and introducing a stiffening wire therein.

The drawings disclose in Fig. 1 a machine similar to the one described in my co-pending application, Serial #55,350, filed October 11, 1915, which is adapted by means of the cleats 1 on the chain 2, interlocking with the cleats 3 on the chain 4, to form the material 5 into a plaited or dove-tailed shape as at 6.

The machine is adapted to be driven by any suitable source of power, not shown, driving the shaft 7, which has keyed thereto a gear 8, meshing with the gear 9, keyed to the shaft 10, thus driving the chains 2 and 4, the action of the machine being similar to that disclosed in my co-pending application.

The material which may be paper or any other suitable material is formed in the machine to approximately the shape desired, but as the cleats roll out of the plaits formed in the material the plaits will be slightly opened, as shown at 11.

The material as it comes from the cleats in Fig. 1 may be passed through a set of sizing rollers, such as 12, Fig. 2, which will compress the plaits from the extended form, shown at 13, to the form desired, shown at 15, and the flat wires 16, which are preferably sharpened at the ends 17, are held rigidly at the other end 18, and through suitable guides 19 prevented from lateral movement, pierce the paper as it is fed on to them by the rollers 12.

The lateral guides 19 are mounted in any suitable manner so they may be depressed by the passage of the paper over the guide rollers, thus allowing the plaited sheet to be fed on over the rollers successively.

The plaited lath-board which is preferably made in sheets of 12, 16 or 18 ft. lengths will thus have the reinforcing flat wire strips 16 strung through the entire length, forming a comparatively rigid and extremely substantial unit.

While I have described my invention and illustrated it in one particular method of forming the sheets and threading the flat wires therein, I do not wish myself to be understood as confining myself to this particular method, as it is evident that my invention may be embodied in various ways within the scope of the following claims.

Claims:

1. The method of making lath-board comprising the passing of paper or other suitable material through plaiting means, passing the completed material so formed through means for pressing the lath-board to the desired thickness, and forcing the material so formed on to reinforcing wires, the wires piercing that portion of the formed material lying in planes at an angle with the completed lath-board.

2. The method of making lath-board comprising the forming of paper or other suitable material into a plaited or dove-tailed shape, and forcing the material so formed on to reinforcing wires, the wires threading through the webs of the plaited form connecting the outer two surfaces of the lath-board so formed, to reinforce and stiffen the lath-board.

SILAS M. FORD.